United States Patent [19]
Mourot et al.

[11] Patent Number: 5,537,438
[45] Date of Patent: Jul. 16, 1996

[54] METHOD OF EQUALIZING A RECEIVE DATA BLOCK IN A TIME-DIVISION MULTIPLE ACCESS COMMUNICATION SYSTEM AND RECEIVER UTILIZING THIS METHOD

[75] Inventors: Christophe Mourot, Asnieres; Vinod Kumar, Paris; Armelle Wautier; Jean-Claude Dany, both of Gif sur Yvette, all of France

[73] Assignee: Alcatel N.V., Amsterdam, Netherlands

[21] Appl. No.: 204,449

[22] Filed: Mar. 2, 1994

[30]  Foreign Application Priority Data

Mar. 3, 1993 [FR] France .................................. 93 02471
Jul. 20, 1993 [FR] France .................................. 93 08875

[51] Int. Cl.$^6$ ........................................................ H03H 7/30
[52] U.S. Cl. ......................... 375/231; 375/232; 375/348; 370/95.3
[58] Field of Search ................................... 375/229–236, 375/261, 262, 266, 324, 340, 341, 346, 348; 455/296, 303, 307; 364/724.19, 724.2; 370/58.1, 68.1, 95.3

[56]  References Cited

U.S. PATENT DOCUMENTS

| | | | |
|---|---|---|---|
| 5,127,051 | 6/1992 | Chan et al. | 380/49 |
| 5,185,764 | 2/1993 | Baier | 375/231 |
| 5,195,106 | 3/1993 | Kazecki et al. | 375/230 |
| 5,214,670 | 5/1993 | Ballatore | 375/231 |
| 5,363,411 | 11/1994 | Furuya et al. | 375/229 |

FOREIGN PATENT DOCUMENTS

0415897A1  3/1991  European Pat. Off. .
0496467A2  7/1992  European Pat. Off. .

OTHER PUBLICATIONS

Doherty eet al, "Equalization for Mobile Communications Channels", *1990 IEEE Military Communications Conference*, vol. 2 of 3, Sep. 1990, pp. 643–647.

Korn, Isreal, "GMSK With Differential Phase Detection in the Satellite Mobile Channel", 1990 IEEE Transactions On Communications, vol. 38, No. 11, Nov. 1990, pp. 1980–1986.

G. W. Davidson, et al, "An investigation of Block–Adaptive Decision Feedback Equalization for Frequency Selective Fading Channels", Can. J. Elect. & Comp. Eng., vol. 13, No. 3–4, 1988., pp. 106–111.

Robert A. Ziegler, et al "Estimation of Time–Varying Digital Radio Channels", IEEE Transactions On Vehicular Technology, vol. 41, No. 2, May 1992, pp. 134–151.

*Primary Examiner*—Stephen Chin
*Assistant Examiner*—Amanda T. Le
*Attorney, Agent, or Firm*—Sughrue, Mion, Zinn, Macpeak & Seas

[57]  ABSTRACT

In mobile radio communications systems using time-division multiple access (TDMA), intersymbol interference caused by time differences in multipath media is avoided by equalizing data blocks. When a data block (BD) is received, the impulse response of the channel on which the block was transmitted is estimated, a set of receive parameters (PP) is evaluated, an optimal length (Nopt) of the block (BD) is determined from the parameters (PP), and when the optimal length (Nopt) is less than the actual length (N) of the block (BD), channel variation tracking (PO) is undertaken.

17 Claims, 2 Drawing Sheets

METHOD OF EQUALIZING A RECEIVE DATA BLOCK IN A TIME-DIVISION MULTIPLE ACCESS COMMUNICATION SYSTEM AND RECEIVER UTILIZING THIS METHOD

BACKGROUND OF THE INVENTION

The present invention concerns a method for equalizing a receive data block in a time-division multiple access communication system.

It also concerns a receiver implementing this method.

In a time-division multiple access (TDMA) communication system, received data blocks have to be equalized to allow for time differences in multipath media causing intersymbol interference.

FIG. 1 is a diagrammatic representation of a data block BD comprising start and end symbols SD and SF, two data sequences D, D', with respective lengths $N_D$, $N_{D'}$, and a learning sequence SA inserted between the two data sequences. The sizing of this data block represents a compromise between:

service requirements, i.e. the number 2N of data symbols to be transmitted per block;

the rate of variation of the transmission channel which imposes an upper limit $N_{max}$ on the number of data symbols in the block and lower and upper limits on the length of the learning sequence; and the required efficiency of the radio channel, which sets a lower limit on the ratio of the number of data symbols in the block to the total block length.

An equalizer is used to correct intersymbol interference in a receiver. To operate correctly, the equalizer must know the impulse response of the transmission channel. To this end known, special symbols are transmitted in the learning sequence. It is assumed that the data symbols transmitted are not known to the receiver. The learning sequence is chosen to suit the characteristics of the transmission channel and, in particular, its length. The learning sequence is usually made up of K precursor symbols, P reference symbols and possibly K "postcursor" symbols where K is the length of the channel defined as the number of symbol durations which is equivalent to the difference between the longest path and the shortest path in the channel and where P>K.

The receiver uses a channel estimator device to establish the impulse response of the channel. It generates a replica of the learning sequence and correlates it with the corresponding received symbol sequence. The result of this correlation is a set of coefficients $h_i$ where i varies from 0 to L and L is the length of the channel, this set of coefficients being used to "teach" the equalizer. $h_0$ represents the most direct path in the channel and all other coefficients represent longer paths which cause interference with the first.

It is essential to size the data sequences of a block in such a way as to be able to reconcile a sufficient or specified efficiency of the radio path, and a valid estimate of the impulse response of the channel for all data symbols, including those at both ends of the block and therefore farthest away from the learning sequence.

A first solution to the problem of intersymbol interference, at the receiving end, is to provide equalization without any device for tracking channel variations. If the received block is too long, the impulse response estimated at the center is no longer valid at the ends. This imposes the use of very short blocks, implying a small number of data symbols as compared with the number of learning symbols.

Another solution is to provide equalization in conjunction with continuous use of a tracking device. However, if the block received is short in comparison to the rate of variation of the channel, the impulse response estimated at the center remains valid at the ends. In this case the tracking device is used when it is not necessary to use it, leading to excessive power consumption.

SUMMARY OF THE INVENTION

An object of the invention is to remedy these drawbacks by proposing a method for equalizing a receive data block, in a time-division multiple access system, which offers greater flexibility and efficiency for time-varying channels than existing methods.

According to the invention, on reception of the block the impulse response of the channel on which the block was transmitted is estimated, a set of receive parameters is evaluated, an optimal block length is determined from said set of parameters, and, if said optimal length is less than the actual length of the block, tracking of variations of the channel is undertaken.

Thus with the method of the invention, the complexity of processing and the power consumption are minimized without compromising performance, since tracking of channel variations is undertaken only when an actual length of the block that is too high can contribute to rendering the estimated impulse response invalid at the ends of the block.

In a preferred embodiment of the method of the invention applied to a data block comprising a learning sequence including a reference sequence and precursor symbols and data symbols divided between a first data sequence and a second data sequence respectively transmitted before and after said learning sequence, said communication channel having an impulse response of finite length, the determination of an optimal length of the data block includes a stage of optimizing the length of each data sequence in which the impulse response of the communication channel is estimated on the basis of the received symbols of the reference sequence and the precursor symbols, each data sequence is associated with an estimate mean-square error a range for which is determined by respective lower and upper limiting functions conditioned among other things by the length of the data sequence and the length of the reference sequence, and said lower and upper limiting functions are used to determine a range for the optimal length of each data sequence corresponding to a specified range of mean-square error.

In another aspect, the invention proposes a receiver of a time-division multiple access communication system comprising means for equalizing a block of data transmitted on a communication channel, said equalizer means including means for tracking variations of said channel, using a method for equalizing a receive data block in a time-division multiple access system wherein when the block is received the impulse response of the channel on which the block was transmitted is estimated, a set of receive parameters is evaluated, an optimal length of the block is determined from said set of parameters, and if said optimal length is less than the actual length of the block, variation tracking is undertaken, which receiver further comprises means for providing according to a set of receive parameters an optimal length of the block, and means for comparing said optimal length to the actual length of the block, said channel variation tracking means being activated only if the comparator means indicate that the optimal length of the block is less than the actual length of the block.

3

Other features and advantages of the invention emerge from the description below.

BRIEF DESCRIPTION OF THE DRAWINGS

The accompanying drawings are given by way of non-limiting example.

DESCRIPTION OF THE PREFERRED EMBODIMENTS

Figure 1:
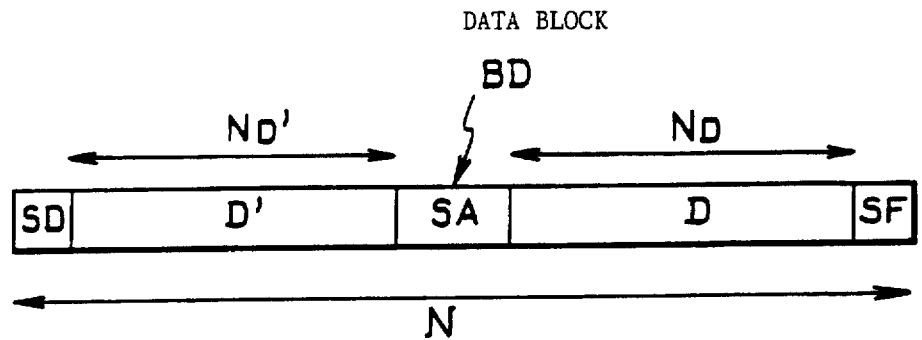
FIG. 1 shows the structure of a data block.

The theory of the equalization method of the invention is explained with reference to FIGS. 1 through 4.

There is an optimal value Nopt for the length of a data block and this optimal value depends on the following parameters:

the length of the channel;

the length of the learning sequence;

the signal to noise ratio;

the maximal Doppler shift (i.e. the maximum frequency offset due to the Doppler effect);

the symbol period, which is the reciprocal of the symbol bit rate; and the modulus of the symbols.

The length of the channel, the length of the learning sequence, the symbol period and the modulus of the symbols are known at the receiver. A typical structure of a learning sequence, which among other things determines its length, is described in French patent application 92 13847.

The signal to noise ratio and the maximal Doppler shift can be estimated but are usually calculated for other purposes within the receiver anyway.

Thus within a receiver it is possible to determine the optimal length Nopt in the sense of the performance required by the communication system.

It is advantageous to establish one or more truth tables giving the optimal length Nopt as a function of the above parameters. Three methods can be used to generate the content of these truth tables.

A first method uses the results of simulation such as those discussed in the article "An investigation of block-adaptive decision feedback equalization for frequency selective fading channels" by G. W. DAVIDSON, D. D. FALCONER and A. U. H. SHEIKH, Canadian J. Elect. & Comp. Eng, Vol. 13 No. 3–4, 1988, which discloses simulation results for a decision feedback equalizer showing the influence of the length of the learning sequence on the performance of a receiver.

For example, simulations have been carried out on adaptive decision feedback hybrid equalizers (DFSE) using a maximum likelihood sequence estimator (MLSE) employing a Viterbi algorithm. This work has indicated an optimal learning sequence length and has led to an estimation method based on simulation of this optimal length in the case of constant amplitude zero-correlation (CAZAC) sequences for quadrature phase shift keying.

In the case of a time-invariant radio channel, the longer the learning sequence the better the channel estimate. In the case of a time-varying multipath mobile radio channel there is an optimal length of the learning sequence and simulation shows that the length of the reference sequence, which represents one part of the learning sequence, must be sufficiently long to enable estimation of the coefficients of the channel but sufficiently short to avoid any significant variation on the channel during the estimate and even during the decoding of the data symbols when there is no channel tracking. This means that an "oversized" learning sequence can degrade the performance of the receiver.

Note that for pseudo-CAZAC type sequences, i.e. sequences which are of the CAZAC type only over a certain range around the main peak, only an inequality can be established for the optimal length for which lower and upper limits are then defined.

A second method for generating these truth tables is to carry out measurements in the field. This method definitely provides remarkable results but can be particularly costly.

A third method is to apply the results of a theoretical study of the reception principle employed. One limitation of this method is that there is at present no theory generally applicable to all reception configurations, only theoretical studies specific to a particular application.

The article "Estimation of Time-Varying Digital Radio Channels" by R. A. ZIEGLER and J. M. CIOFFI, IEEE Transactions on Vehicular Technology, Vol. 41, No 2, May 1992 shows the benefit of allowing for the length of the learning sequence and the length of the data and provides theoretical information for estimating or calculating some receive parameters. In this regard a complete analytical method has been developed giving upper and lower limits for the optimal length of the learning sequence and the length of the data for CAZAC and pseudo-CAZAC sequences and for phase shift keying.

Figure 2:
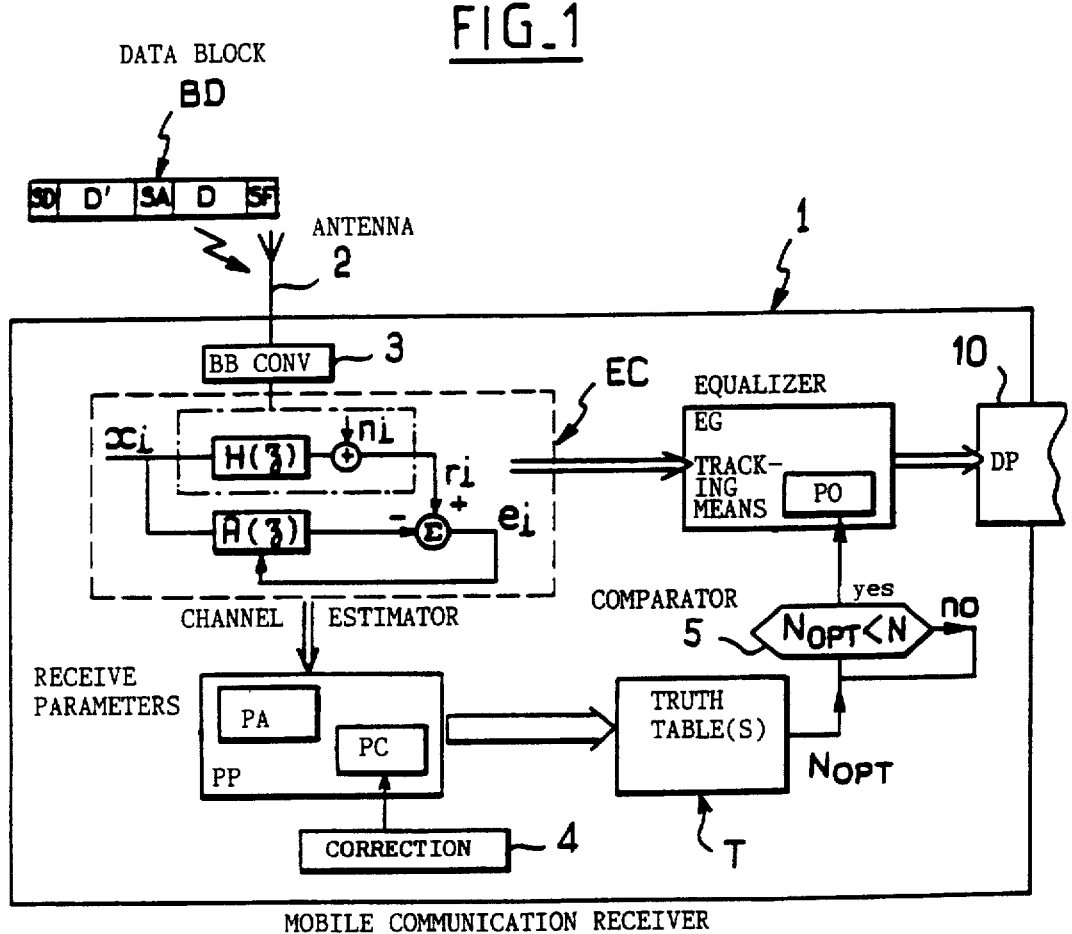
FIG. 2 is a block diagram of the essential operations implemented in the method of the invention.

One embodiment of the method of the invention in a mobile communication receiver 1 is described with reference to FIG. 2.

After a block BD transmitted by radio is received at an antenna 2, and processed by baseband converter 3 to obtain a baseband signal, a channel estimate EC is produced (i.e. an estimate of the impulse response of the channel).

If $\{x_i\}$ and $\{r_i\}$ respectively represent sets of input and output variables observed during an estimation period and if $n_i$ represents an additive noise term at a time iTs where Ts is the symbol period, the equivalent baseband channel with response H(z) is modeled by a time-invariant digital transversal filter of response H(z). The coefficients of the transversal filter are adjusted according to error information $e_i$.

On the basis of the estimation result EC and other information obtained from a frequency offset corrector device 4 in the receiver, for example, a set of receive parameters PP is obtained comprising known parameters PA and parameters PC to be calculated. Note that the parameters that are directly accessible are the length K of the channel, the length SA of the learning sequence, the symbol period and the modulus of the symbols. The parameters to be calculated are the signal to noise ratio and the maximal Doppler shift. A truth table T held in non-volatile memory or any other equivalent device is addressed by all or some of the parameters P to obtain an estimate of the optimal length Nopt which is then compared to the actual length N of the block to determine if channel variation tracking PO should be effected or not during the equalization process EG.

A preferred method of determining the optimal length of a data block which can be utilized in the context of the equalization method according to the invention is described with reference to FIGS. 3 through 4.

Notation

K: the length of the impulse response of the channel RIC,
P: the length of the reference sequence SR within the learning sequence SA,
L: the length of the learning sequence SA,
H: the vector of the coefficients of the actual impulse response (this vector is not directly accessible at the receiver),
Ĥ: the vector of the coefficients of the estimated impulse response of the channel,
R: the vector of the received symbols corresponding to the reference sequence SR within the learning sequence SA,
B: the vector of the noise samples on the communication channel, where $b_i$ represents Gaussian white noise with a zero average and a variance of $\sigma_N^2/2$, $$H: \begin{vmatrix} h_0 \\ h_1 \\ \cdot \\ \cdot \\ h_K \end{vmatrix} \quad \hat{H}: \begin{vmatrix} \hat{h}_0 \\ \hat{h}_1 \\ \cdot \\ \cdot \\ \hat{h}_K \end{vmatrix} \quad R: \begin{vmatrix} r_{K+1} \\ r_{K+2} \\ \cdot \\ \cdot \\ r_L \end{vmatrix} \quad B: \begin{vmatrix} b_{K+1} \\ b_{K+2} \\ \cdot \\ \cdot \\ b_L \end{vmatrix}$$

E: the vector of the coefficients of the estimate mean-square error, and
A: a matrix $(L-K)\times(K+1)$ completely defined by the learning symbols transmitted $x_1, \ldots, x_L$.

$$A^H = \begin{bmatrix} x_{K+1}^* & \cdot & \cdot & x_L^* \\ x_K^* & \cdot & \cdot & \cdot \\ \cdot & & & \cdot \\ x_1^* & \cdot & \cdot & x_{L-K}^* \end{bmatrix}$$

where $\cdot^H$ is the Hermitian operator and $\cdot^*$ is the complex conjugation operator. Although this channel is theoretically of infinite length, it is usual to employ an approximation by a linear transversal filter of finite length $K+1$, as disclosed, for example, in "Digital Communications", J. G. PROKIS, 2nd edition, MCGRAW HILL, 1989.

The vector of the received reference symbols R and $x_i, \ldots, x_L$ are related by the following equation:

$$r_i = \sum_{k=0}^{K} h_k x_{i-k} + b_i \quad i = K+1, \ldots, L \tag{1}$$

This equation can be written in the following form:

$$R = AH + B \tag{2}$$

Also: $E = R - A\hat{H}$ \hfill (3)

By definition: $J = E^H E$ \hfill (4)

H is chosen by a least squares estimate. H minimizes J and therefore satisfies:

$$\frac{\partial J}{\partial H} = -2A^H R + 2A^H A H = 0 \tag{5}$$

This equation has a single solution if and only if $L \geq 2K+1$, i.e. if and only if the number of columns in $A^H$ is greater than or equal to the number of rows.

If the matrix $A^H A$ can be inverted, the following expression is obtained:

$$\hat{H} = (A^H A)^{-1} A^H R \tag{6}$$

Constant amplitude zero auto-correlation (CAZAC) and pseudo-CAZAC sequences satisfy this condition.

In the case of a time-varying channel, standardized correlation functions $R_j(\Delta_t)$ are defined for the various paths of the channel. In addition to the correlation properties of the learning sequence, the exact value of the symbols which constitute it affect the accuracy of the estimated impulse response of the channel. For a CAZAC sequence, however, assuming that the various paths of the channel and the noise samples are statistically independent, a time-varying channel can be modeled by a digital transversal filter.

The coefficients of the impulse response satisfy:

$$E[h_i(k)h_j^*(l)] = 0 \text{ for } i \neq j \; \forall \; k, l \tag{7}$$

$$E[h_j(k)h_j^*(l)] = \sigma_j^2 R_j((k-l)T_s) \; \forall \; k, l \tag{8}$$

where:
Ts is the symbol transmission period, and
$\sigma_j^2$ is the average power of the jth path
To simplify the description, R(k) is substituted for $R(kT_s)$ throughout the remainder of the description.

It is assumed hereinafter that the learning sequence is of the CAZAC type and periodic with period P. Consider the symbols $u_0, \ldots, u_{P-1}$ of the reference sequence sent on the communication channel. To facilitate the notation, hereinafter:

$$u_{-i} = u_{P-i} \; i \in [1, P-L], \; u_{i+P} = u_i \; i \in [0, P-1] \tag{9}$$

It is further assumed that $|u_i| = 1$. The sample received without noise can be expressed as follows:

$$y(n) = \sum_{k=0}^{K} u_{n-k} h_k(n) \text{ for } n \in [0, P-1] \tag{10}$$

In the absence of noise, and from equation (6), an estimate of the channel coefficients is expressed as follows:

$$\hat{h}_i = \frac{1}{P} \sum_{\lambda=1}^{P} \sum_{k=0}^{K} u_{\lambda-i-1}^* u_{\lambda-k-1} h_k(\lambda - 1) \text{ for } i \in [0, K] \tag{11}$$

The mean-square error of the coefficient estimate is given by:

$$E[(\hat{h}_i - h_i(n))(\hat{h}_i - h_i(n))^*] = E[\hat{h}_i \hat{h}_i^*] - E[\hat{h}_i h_i^*(n)] - E[\hat{h}_i^* h_i(n)] + \sigma_i^2 E[h_i h_i^*(n)] \tag{12}$$

can be expressed as follows:

$$E[\hat{h}_i h_i^*(n)] = \frac{1}{P} \sum_{\lambda=1}^{P} \sum_{k=0}^{K} u_{\lambda-i-1}^* u_{\lambda-k-1} h_k(\lambda - 1) h_i^*(n) \tag{13}$$

From equation (7), it can be deduced that:

$$E[\hat{h}_i h_i^*(n)] = \frac{1}{P} \sum_{\lambda=1}^{P} |u_{\lambda-i-1}|^2 h_i(\lambda - 1) h_i^*(n) \tag{14}$$

and consequently that:

$$E[\hat{h}_i h_i^*(n)] = E[\hat{h}_i h_i(n)] = \frac{1}{P} \sigma_i^2 \sum_{\lambda=1}^{P} R_i(\lambda - n - 1) \tag{15}$$

is defined by:

$$E[\hat{h}_i \hat{h}_i^*] = \frac{1}{P^2} E\left( \sum_{\lambda=1}^{P} \sum_{\gamma=1}^{P} \sum_{k=0}^{K} \sum_{l=0}^{K} u_{\lambda-k-1} u_{\lambda-i-1}^* u_{\gamma-l-1}^* u_{\gamma-i-1} h_k(\lambda-1) h_l^*(\lambda-1) \right) \quad (16)$$

From equations (7) and (8), it follows that:

$$E[\hat{h}_i \hat{h}_i^*] = \frac{1}{P^2} \sum_{\lambda=1}^{P} \sum_{\gamma=1}^{P} \sum_{k=0}^{K} u_{\lambda-k-1} u_{\lambda-i-1}^* u_{\gamma-k-1}^* u_{\gamma-i-1} \sigma_k^2 R_k(\lambda-\gamma) \quad (17)$$

To obtain an upper limit of, $$\sum_{i=0}^{K} E[h_i h_i^*],$$

it is possible to use an inequality relating length P of the reference sequence and the length K of the impulse response of the channel imposed to satisfy the uniquely defined nature of the H estimate vector:

$$P \geq K+1 \quad (18)$$

From this inequality it can be deduced that:

$$\sum_{i=0}^{K} E[\hat{h}_i \hat{h}_i^*] \leq \sum_{i=0}^{P-1} E[\hat{h}_i \hat{h}_i^*] \quad (19)$$

Accordingly:

$$\sum_{i=0}^{K} E[\hat{h}_i \hat{h}_i^*] \leq \frac{1}{P^2} \sum_{i=0}^{P-1} \sum_{\lambda=1}^{P} \sum_{\gamma=1}^{P} \sum_{k=0}^{K} u_{\lambda-k-1} u_{\lambda-i-1}^* u_{\gamma-k-1}^* u_{\gamma-i-1} \sigma_k^2 R_k(\lambda-\gamma) \quad (20)$$

$$\leq \frac{1}{P^2} \sum_{\lambda=1}^{P} \sum_{\gamma=1}^{P} \sum_{k=0}^{K} u_{\lambda-k-1} u_{\gamma-k-1}^* \sigma_k^2 R_k(\lambda-\gamma) \sum_{i=0}^{P-1} u_{\lambda-i-1}^* u_{\gamma-i-1} \quad (21)$$

As the reference sequence is assumed to be of the CAZAC type, it follows that:

$$\sum_{i=0}^{P-1} u_{\lambda-i-1}^* u_{\gamma-i-1} = 0 \text{ for } \lambda \neq \gamma \quad (22)$$

Consequently:

$$\sum_{i=0}^{K} E(\hat{h}_i \hat{h}_i^*) \leq \frac{1}{P} \sum_{\lambda=1}^{P} \sum_{k=0}^{K} u_{\lambda-k-1} u_{\lambda-k-1}^* \sigma_k^2 R_k(0) \quad (23)$$

$$\leq \frac{1}{P} \sum_{k=0}^{K} \sigma_k^2 R_k(0) \sum_{\lambda=1}^{P} |u_{\lambda-k-1}|^2 \quad (23.1)$$

$$\leq \frac{1}{P} \sum_{k=0}^{K} \sigma_k^2 R_k(0) P \quad (23.2)$$

$$\leq \sum_{k=0}^{K} \sigma_k^2 \quad (23.3)$$

$$\sum_{i=0}^{K} E(\hat{h}_i \hat{h}_i^*) \leq \sigma^2 \quad (24)$$

where $\sigma^2 = \sum_{k=0}^{K} \sigma_k^2 \quad (25)$ where
$\sigma^2$ represents the average power of the channel.
It remains to determine a lower limit for $$\sum_{i=0}^{K} E(\hat{h}_i \hat{h}_i^*).$$

To this end an average estimate $\bar{h}_i$ of the channel coefficients estimates is introduced with a cyclic offset of the same learning sequence:

$$\bar{h}_i = \frac{1}{P^2} \sum_{n=0}^{P-1} \sum_{\lambda=1}^{P} \sum_{k=0}^{K} u_{\lambda-k-1+n} u_{\lambda-i-1+n}^* h_k(\lambda-1) \quad (26)$$

$$= \frac{1}{P} \sum_{\lambda=1}^{P} h_i(\lambda-1) \quad (26.1)$$

It is then possible to deduce an upper limit for the following inequality:

$$E[(\hat{h}_i - \bar{h}_i)(\hat{h}_i - \bar{h}_i)^*] = E[\hat{h}_i \hat{h}_i^*] - E[\hat{h}_i \bar{h}_i^*] - E[\bar{h}_i \hat{h}_i^*] + E[\bar{h}_i \bar{h}_i^*] \geq 0 \quad (27)$$

Now:

$$E[\bar{h}_i \bar{h}_i^*] = \frac{1}{P^2} \sum_{\lambda=1}^{P} \sum_{\gamma=1}^{P} \sigma_i^2(\lambda - \gamma) \quad (29)$$

Substituting equations (28) and (29) in equation (27):

$$E[\hat{h}_i \hat{h}_i^*] \geq \frac{1}{P^2} \sum_{\lambda=1}^{P} \sum_{\gamma=1}^{P} \sigma_i^2 R_i(\lambda - \gamma) \quad (30)$$

Finally:

$$\sum_{i=0}^{K} E[(h_i - h_i(n))(h_i - h_i(n))^*] \leq \quad (31)$$

$$\sum_{i=0}^{K} 2\sigma_i^2 \left( 1 - \frac{1}{P} \sum_{\lambda=1}^{P} R_i(\lambda - n - 1) \right)$$

$$\sum_{i=0}^{K} E[(h_i - h_i(n))(h_i - h_i(n))^*] \geq \quad (32)$$

$$\sum_{i=0}^{K} \sigma_i^2 \left( 1 - \frac{2}{P} \sum_{\lambda=1}^{P} R_i(\lambda - n - 1) \right) +$$

$$\frac{1}{P^2} \sum_{\lambda=1}^{P} \sum_{\gamma=1}^{P} R_i(\lambda - \gamma))$$

Figure 3:
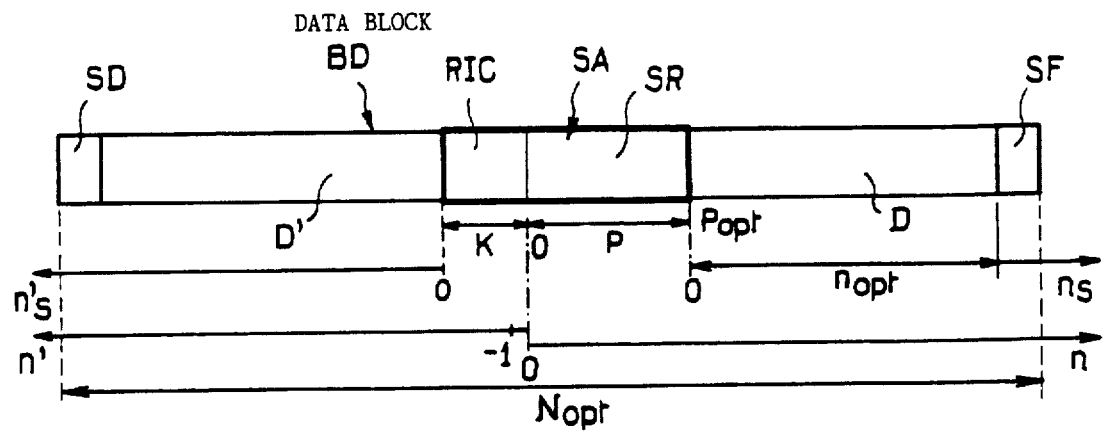
FIG. 3 shows the main dimensional parameters of the structure of a data block used in the method of the invention.
Figure 4:
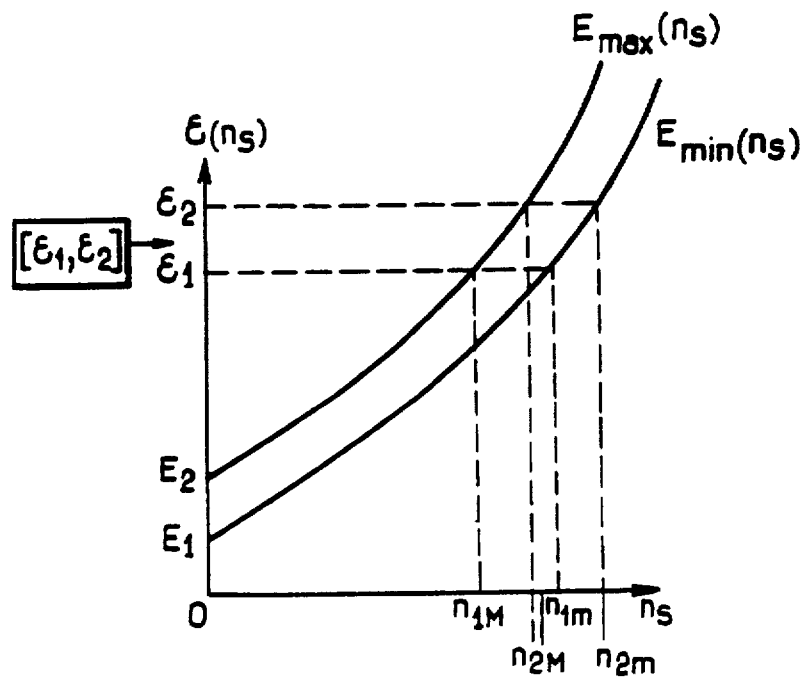
FIG. 4 shows a graphical method for determining the optimal length of a data sequence with the method of the invention.

It is then beneficial to make the following variable substitution, with reference to FIG. 3:

$$n_s = n - p \quad (33)$$

$$\sum_{\lambda=1}^{P} R_i(\lambda - n - 1) = \sum_{\mu=1}^{P} R_i(-\mu - P - n) = \sum_{\mu=1}^{P} R_i(\mu + n_s) \quad (34)$$

For the part preceding the learning sequence, by introducing a new variable $n' = -n - 1$, with reference to FIG. 3:

$$n'_s = n' + K \quad (35)$$

$$\sum_{\lambda=1}^{P} R_i(\lambda - n - 1) = \sum_{\lambda=1}^{P} R_i(\lambda + n') = \sum_{\lambda=1}^{P} R_i(\lambda + n_3' + K) \quad (36)$$

Next the upper and lower limits of the estimate error are determined according to the new variable $n_s$.

$$\sum_{i=0}^{K} E|\hat{h}_i - h_i(n_s)|^2| \leq \frac{(K+1)\sigma_n^2}{P} + \quad (37)$$

$$\sum_{i=0}^{K} 2\sigma_i^2 \left[ 1 - \frac{1}{P} \sum_{\lambda=1}^{P} R_i(\lambda + n_s) \right]$$

$$\sum_{i=0}^{K} E|\hat{h}_i - h_i(n_s)|^2| \geq \frac{(K+1)\sigma_n^2}{P} + \quad (38)$$

$$\sum_{i=0}^{K} \sigma_i^2 \left[ 1 - \frac{2}{P} \sum_{\lambda=1}^{P} R_i(\lambda + n_s) + \frac{1}{P^2} \sum_{\lambda=1}^{P} \sum_{\gamma=1}^{P} R_i(\lambda - \gamma) \right]$$

where $\sigma_i^2$ is the average power of the ith path and $n_s$ corresponds to the first symbol after the learning sequence in the block.

For the data sequence D preceding the learning sequence the inequalities (37) and (38) become:

$$\sum_{i=0}^{K} E|\hat{h}_i - h_i(n'_s)|^2| \leq \frac{(K+1)\sigma_n^2}{P} + \quad (37')$$

$$\sum_{i=0}^{K} 2\sigma_i^2 \left[ 1 - \frac{1}{P} \sum_{\lambda=1}^{P} R_i(\lambda + n'_s + K) \right]$$

$$\sum_{i=0}^{K} E|\hat{h}_i - h_i(n'_s)|^2| \geq \frac{(K+1)\sigma_n^2}{P} + \quad (38')$$

$$\sum_{i=0}^{K} \sigma_i^2 \left[ 1 - \frac{2}{P} \sum_{\lambda=1}^{P} R_i(\lambda + n'_s + K) + \frac{1}{P^2} \sum_{\lambda=1}^{P} \sum_{\gamma=1}^{P} R_i(\lambda - \gamma) \right]$$

It is now assumed that the receiver is moving at constant speed and that multipaths due to a large number of reflections have a uniform distribution of angles of incidence. The standardized correlation functions $R_i(\Delta_t)$ are then assumed to be equal to $R(\Delta_t)$ which is the Fourrier transform of the conventional Doppler spectrum and is given by:

$$R(\Delta_t) = J_0(2\pi f_d \Delta t) \quad (39)$$

where $J_0$ is the first order Bessel function and $f_d$ is the maximal Doppler shift given by:

$$f_d = \frac{f_0 v}{c} \quad (40)$$

where $f_0$ is the carrier frequency, $v$ is the speed of the mobile and c is the speed of sound.

This represents the worst case situation for a time-varying mobile channel. If $2\pi f_d T_s n_s$ is small in comparison with 1, the following approximation holds:

$$R(n_s T_s) \approx 1 - (\pi f_d T_s n_s)^2 n_s^2 \quad (41)$$

Let $\epsilon(n_s)$ denote the standardized estimate error at symbol position $n_s$, defined by:

$$\epsilon(n_s) = \frac{1}{\sigma^2} \sum_{i=0}^{K} E|\hat{h}_i - h_i(n_s)|^2| \quad (42)$$

where $\sigma^2$ is the average power of the channel, given by:

$$\sigma^2 = \sum_{i=0}^{K} \sigma_i^2 \quad (43)$$

The remainder of this description considers quadrature phase shift keying (QPSK). The ratio $$\frac{|s|^2 \sigma^2}{\sigma_n^2}$$

can be replaced with the signal to noise ratio $2E_b/N_0$ where $E_b$ denotes the energy transmitted per bit and $N_0/2$ is the bilateral density of Gaussian additive white noise. In the present instance there are two bits per symbol but more generally there are $\log_2 M$ bits per symbol in phase shift keying with M states (MPSK).

It is then possible to define upper and lower limit functions for the optimal length of the data sequence.

$$\epsilon(n_s) \leq \frac{K+1}{P} \cdot \frac{N_0}{2E_b} + \quad (44)$$

$$2(\pi f_d T_s)^2 \left( \frac{(P+1)(2P+1)}{6} + (P+1)n_s + n_s^2 \right) = E_{max}(n_s)$$

$$\epsilon(n_s) \geq \frac{K+1}{P} \cdot \frac{N_0}{2E_b} + \quad (45)$$

$$2(\pi f_d T_s)^2 \left( \frac{(P+1)^2}{4} + (P+1)n_s + n_s^2 \right) = E_{min}(n_s)$$

The following limiting functions are obtained in the same way for the data sequence D' preceding the learning sequence:

$$\epsilon(n'_s) \leq \frac{K+1}{P} \cdot \frac{N_0}{2E_b} + \quad (44')$$

$$2(\pi f_d T_s)^2 \left( \frac{(P+1)(2P+1)}{6} + (P+1)(n'_s + K) + (n'_s + K)^2 \right) = E_{max}(n'_s)$$

$$\epsilon(n'_s) \geq \frac{K+1}{P} \cdot \frac{N_0}{2E_b} + \quad (45')$$

$$2(\pi f_d T_s)^2 \left( \frac{(P+1)^2}{4} + (P+1)(n'_s + K) + (n'_s + K)^2 \right) = E_{min}(n'_s)$$

The optimal length $n_{opt}$ of a block, which must be chosen so that the corresponding estimate mean-square error is in a predetermined range, depends on the following parameters:

the length K of the channel, the length P of the reference sequence, the signal to noise ratio $E_b/2N_0$, the maximum Doppler shift $f_d$, and the symbol period $T_s$, which is the reciprocal of the symbol bit rate.

The above two limiting functions can be represented graphically as two parabolas which intersect the ordinate axis at E1 and E2 (see FIG. 4):

$$E1 = \frac{K+1}{P} \cdot \frac{N_0}{2E_b} + 2(\pi f_d T_s)^2 \frac{(P+1)^2}{4} \quad (46)$$

$$E2 = \frac{K+1}{P} \cdot \frac{N_0}{2E_b} + 2(\pi f_d T_s)^2 \frac{(P+1)(2P+1)}{6} \quad (47)$$

Only positive values of $n_s$ are relevant, as $n_s$ represents a length and is therefore always zero or positive.

The optimal length $n_{opt}$ can therefore be determined graphically (see FIG. 4): arrange [$\epsilon_1$, $\epsilon_2$] is specified for $\epsilon(n_s)$. This range of error is applied to the two lower and upper limit functions to deduce therefrom two ranges $[n_{1M}, n_{1m}]$ and $[n_{2M}, n_{2m}]$ respectively corresponding to the lower limit $\epsilon_1$ and to the upper limit $\epsilon_2$. The intersection of these two ranges provides a resultant range from which an optimal length $n_{opt}$ can be chosen for the data sequence.

A similar procedure can be applied to determine a range for the optimal length $n'_{opt}$ of the data sequence D' preceding the learning sequence. Also, if both data sequences are exactly the same length, then considerations of symmetry show that $n_{opt}=n'_{opt}$.

The length P of the reference sequence is in practice chosen once and for all and optimized for expected average variations of the channel. This length is then a parameter of the receiver involved in the determination of the optimal length of the data block.

An estimate of the optimal length Nopt of a data block is obtained by summing the respective estimated optimal lengths $n_{opt}$, $n'_{opt}$ of the two data sequences D, D', the length P of the reference sequence SR and the length K of the impulse response of the channel.

If this optimal length Nopt is greater than the actual length N of the block, then tracking is not used in the process of estimating the channel and equalization.

On the other hand, if the optimal length Nopt is less than the actual length of the block, then channel variation tracking PO is used within the equalization process EG before subsequent processing (10) of the received data symbols.

Because of the hypothesis adopted, the symbols in a sub-block of the data block of length Nopt centered on the learning sequence do not require any channel variation tracking.

It follows that the tracking device must enable updating of the channel estimate for the symbols of the data block which are not in this sub-block but it is not indispensable for this update to be done for the symbols of the sub-block.

Thus the tracking device is used only when necessary to guarantee receiver performance, which in practice brings about a significant reduction in power consumption.

All the operations described: channel estimation, equalization, tracking, are applied to digital values and can therefore be implemented easily using one or more digital integrated circuits.

It is feasible to calculate the optimal length Nopt of the block directly by means of a dedicated or non-dedicated processor using mathematical functions obtained from a theoretical study of the channel, for example the limiting functions established above. Calculating means in the receiver, and more generally, control and processing means, can be used to determine the optimal length ($N_{OPT}$) of a data block (BD).

Of course, the invention is not limited to the examples just described and many modifications can be made to these examples without departing from the scope of the invention. For example, it is feasible to consider receive parameters other than those mentioned in the description. Also, other methods can be used to construct the truth tables in implementing the method of the invention.

We claim:

1. A method for equalizing a receive data block (BD) in a time-division multiple access (TDMA) system, comprising the steps of:

estimating, when the block (BD) is received, the impulse response of the channel on which the block (BD) was transmitted;

evaluating a set (P) of receive parameters; determining an optimal length of the block (Nopt) from said set (P) of parameters; and when said optimal length (Nopt) is less than the actual length (N) of the block, using channel variation tracking (PO) within an equalization process to produce an output signal.

2. Method according to claim 1 wherein the received block (BD) comprises data symbols (D, D') and a learning sequence (SA), characterized in that said set (P) of parameters comprises parameters (PA) known at the receiving end, including the parameters of the channel and the length of said learning sequence (SA), and parameters (PC) to be calculated, including the signal to noise ratio and the maximal frequency offset due to the Doppler effect.

3. Method according to claim 2 characterized in that the parameters (PA) known at the receiving end further comprise the symbol period and the modulus of the symbols.

4. The method according to claim 2 wherein:

the parameters (PC) to be calculated, including the maximal frequency offset due to the Doppler effect, comprise parameters calculated at the receiving end for purposes other than the purpose of equalizing the block (BD).

5. Method according to claim 1 characterized in that said data block (BD) comprises a learning sequence (SA) including a reference sequence (SR) and precursor symbols and data symbols divided between a first data sequence (D') and a second data sequence (D) respectively transmitted before and after said learning sequence (SA), said communication channel having an impulse response of finite length (K), characterized in that the determination of an optimal length ($N_{opt}$) of the data block (BD) includes a stage of optimizing the length ($n_s$, $n'_s$) of each data sequence (D, D') in which the impulse response of the communication channel is estimated on the basis of the received symbols (R) of the reference sequence (SR) and the precursor symbols, each data sequence (D, D') is associated with an estimate mean-square error, a range for which is determined by respective lower and upper limiting functions ($E_{min}(n_s)$, $E_{max}(n_s)$; $E'_{min}(n_s)$, $E'_{max}(n_s)$) conditioned among other things by the length ($n_s$) of the data sequence and the length of the reference sequence, and said lower and upper limiting functions are used to determine a range ($n_{opt}$, $n'_{opt}$) for the optimal length of each data sequence corresponding to a specified range of mean-square error.

6. Method according to claim 5 applied to data blocks comprising constant amplitude zero auto-correlation (CAZAC) or pseudo-CAZAC type sequences, the noise affecting the communication channel being approximated by Gaussian additive white noise, characterized in that the standardized estimate mean-square error corresponding to the data sequence (D) following the reference sequence (SR) is limited by respective lower and upper limit functions ($E_{min}(n_s)$, $E_{max}(n_s)$) as follows:

$$E_{min}(n_s) =$$

$$\frac{K+1}{P} \cdot \frac{N_0}{2E_b} + 2(\pi f_d T_s)^2 \left( \frac{(P+1)^2}{4} + (P+1)n_s + n_s^2 \right)$$

$$E_{max}(n_s) = \frac{K+1}{P} \cdot \frac{N_0}{2E_b} +$$

$$2(\pi f_d T_s)^2 \left( \frac{(P+1)(2P+1)}{6} + (P+1)n_s + n_s^2 \right)$$

where:

$n_s$ is the length of the data sequence,

K is the length of the channel,

P is the length of the reference sequence,

Ts is the symbol period,

No/2 is a bilateral Gaussian additive white noise density, $E_b$ is the energy transmitted per bit, and $f_d$ is the maximum frequency offset due to the Doppler effect, and a range [$n_{2M}$, $n_{1m}$] for the optimal length ($n_{opt}$) is determined by applying a specified range [$\epsilon_1$, $\epsilon_2$] of mean-square error to the lower and upper limiting functions ($E_{min}(n_s)$, $E_{max}(n_s)$).

7. Method according to claim 5 applied to data blocks comprising constant amplitude zero auto-correlation (CAZAC) and pseudo-CAZAC type sequences, the noise affecting the communication channel being approximated by Gaussian additive white noise, characterized in that the standardized estimate mean-square error corresponding to the data sequence (D) preceding the reference sequence (SR) is limited by lower and upper limit functions ($E'_{min}(n'_s)$, $E'_{max}(n'_s)$) as follows:

$$E'_{min}(n'_s) = \frac{K+1}{P} \cdot \frac{N_0}{2E_b} +$$

$$2(\pi f_d T_s)^2 \left( \frac{(P+1)^2}{4} + (P+1)(n'_s + K) + (n'_s + K)^2 \right)$$

$$E'_{max}(n'_s) = \frac{K+1}{P} \cdot \frac{N_0}{2E_b} +$$

$$2(\pi f_d T_s)^2 \left( \frac{(P+1)(2P+1)}{6} + (P+1)(n'_s + K) + (n'_s + K)^2 \right)$$

where:

$n'_s$ is the length of the data sequence preceding the reference sequence,

K is the length of the channel,

P is the length of the reference sequence, $T_s$ is the symbol period,

No/2 is a bilateral Gaussian additive white noise density, $E_b$ is the energy transmitted per bit, and $f_d$ is the maximum frequency offset due to the Doppler effect and in that a range for the optimal length ($n'_{opt}$) is determined by applying a specified range [$\epsilon'_1$, $\epsilon'_2$] of mean-square error to the lower and upper limiting functions ($E'_{min}(n'_s)$, $E'_{max}(n'_s)$).

8. The method according to claim 1, wherein the equalization process includes the step of accessing the optimal length (Nopt) of the block (BD) by reading one or more truth tables (T) addressed by all or part of the set (P) of parameters.

9. Method according to claim 8 characterized in that the truth tables (T) supplying the optimal length (Nopt) of the block (BD) are constructed from the results of previous simulations of channel performance.

10. Method according to claim 8 characterized in that the truth tables (T) for determining the optimal length (Nopt) of the block (BD) are constructed from previous measurements carried out on site.

11. Method according to claim 8 characterized in that the truth tables (T) for determining the optimal length (Nopt) of the block (BD) are constructed from the results of a theoretical study of receive performance.

12. The method according to claim 1 applied to constant amplitude zero auto-correlation (CAZAC) or pseudo-CAZAC sequences in which the optimal length (Nopt) of the block (BD) is chosen between a lower limit ($n_{2M}$) and an upper limit ($n_{1M}$), which are determined from receive parameters (P).

13. A receiver (1) for use in a time-division multiple access (TDMA) communication system, said receiver comprising:

means (EG) for equalizing a block of data (BD) transmitted on a communication channel, including means (PO) for tracking variations of said channel;

means for estimating, when the block (BD) is received, the impulse response of the channel on which the block (BD) was transmitted;

means for evaluating a set (P) of receive parameters;

means for providing, according to the set (P) of receive parameters, an optimal length (Nopt) of the block (BD); and means (5) for comparing the optimal length (Nopt) to an actual length (N) of the block (BD);

wherein the channel variation tracking means (PO) performs the channel variation tracking to produce an output signal only when the comparator means (5) indicates that the optimal length (Nopt) of the block (BD) is less than the actual length (N) of the block (BD).

14. Receiver (1) according to claim 13 characterized in that the means for supplying the optimal length (Nopt) of the block (BD) comprise means for storing one or more truth tables (T) addressed by some or all of the receive parameters (P) and supplying as output said optimal length (Nopt) of the block (BD).

15. Receiver (1) according to claim 13 characterized in that it further comprises means (4) for calculating some receive parameters (PC) including a signal to noise ratio or a maximal frequency offset due to the Doppler effect.

16. The receiver (1) according to claim 13, wherein the means for providing the optimal length (Nopt) comprises control and processor means.

17. The receiver according to claim 13 applied to constant amplitude zero auto-correlation (CAZAC) or pseudo-CAZAC sequences in which the optimal length (Nopt) of the block (BD) is chosen between a lower limit ($n_{2M}$) and an upper limit ($n_{1M}$), which are determined from receive parameters (P).

* * * * *